United States Patent
Simonsen et al.

(10) Patent No.: US 6,989,733 B2
(45) Date of Patent: Jan. 24, 2006

(54) METHOD AND SYSTEM FOR ADAPTING A TELEPHONE LINE MODEM FOR USE ON THE POWER LINE

(75) Inventors: John M. Simonsen, Provo, UT (US); Gordon E. Smith, Sandy, UT (US); W. Paul Willis, Alpine, UT (US); Daniel J. McGuire, Salt Lake City, UT (US); Douglas A. Steck, Riverton, UT (US)

(73) Assignee: Phonex Broadbank Corp., Midvale, UT (US)

( * ) Notice: Subject to any disclaimer, the term of this patent is extended or adjusted under 35 U.S.C. 154(b) by 805 days.

(21) Appl. No.: 09/846,744

(22) Filed: May 1, 2001

(65) Prior Publication Data

US 2002/0031226 A1    Mar. 14, 2002

Related U.S. Application Data

(60) Provisional application No. 60/201,221, filed on May 2, 2000.

(51) Int. Cl.
*H04M 11/04*    (2006.01)
*H04K 1/00*    (2006.01)

(52) U.S. Cl. ............... 340/310.01; 340/310.08; 380/255; 709/230; 713/150; 713/151; 375/259

(58) Field of Classification Search ........... 340/310.01–310.08; 375/257–259; 380/255; 713/150
See application file for complete search history.

(56) References Cited

U.S. PATENT DOCUMENTS

| | | | |
|---|---|---|---|
| 6,243,413 B1 * | 6/2001 | Beukema | 375/222 |
| 6,442,129 B1 * | 8/2002 | Yonge et al. | 370/204 |
| 6,560,234 B1 * | 5/2003 | Ben-Michael et al. | 370/401 |
| 2002/0078247 A1 * | 6/2002 | Lu et al. | 709/251 |

* cited by examiner

*Primary Examiner*—Donnie L. Crosland
(74) *Attorney, Agent, or Firm*—Lloyd W. Sadler

(57) ABSTRACT

A new method and system for adapting standard home network protocol communication signals for communication between networked computation devices over the AC power line is provided. This invention provides improvements to the standard home network protocol required for use over the AC power line, including such features as encrypting, signal amplification and improved signal to noise ratio.

4 Claims, 8 Drawing Sheets

METHOD AND SYSTEM FOR ADAPTING A TELEPHONE LINE MODEM FOR USE ON THE POWER LINE

CROSS REFERENCE TO RELATED APPLICATIONS

This application is based on U.S. Provisional Application Ser. No. 60/201,221, which was filed on May 2, 2000, and priority is claimed thereto.

BACKGROUND OF INVENTION

1. Field of the Invention

This invention relates to voice and data communication systems and methods. More specifically, this invention relates to voice and data communication systems and methods that adapt telephone voice and modem signals for use on an AC power line, which uses a high speed computer networking phone line modem standard.

2. Description of Related Art

A variety of AC power line communication systems have been developed and are widely used in order to facilitate communication within a facility where dedicated wiring is unavailable. A variety of "home networking" computer communication standards have also been proposed. Included in these "standards" are HomePNA 2.0, CEA R.7.3, HomePlug 1.0, IEEE 8.02.11, HomeRF and Bluetooth 803.xx. However, the use of a power line communication channel imposes several important requirements on the method and system of networking computers and other digital devices. No prior system or method specifically addresses the requirements of AC power line communications while providing a standard for data communication as required to effectively network computer, and other similar devices, within a structure or facility. This is the subject matter of this invention.

SUMMARY OF INVENTION

It is desirable to provide a method and system for adapting high-speed computer modem signals for transmission over an AC power line. Moreover, it is desirable to provide such a method and system that meets the specific requirements of wireless networking over the AC power line.

Therefore, it is the general object of this invention to provide a system, which employs a standard "home" computer networking protocol.

It is a further object of the preferred embodiment of this invention to employ a HomePNA-type standard protocol.

Another object of this invention is to provide enhancements, such as additional signal amplification, error correction, filtering, and security encryption as required to facilitate the use of the AC power line communication channel.

A still further object of this invention is to provide a method of communicating between two or more digital computation devices using a standard protocol over the AC power line channel.

It is another object of this invention to provide a method and device for communicating over the AC power line that permits the use of a wide range of modulation methods.

These and other objects of this invention will be readily apparent to those of ordinary skill in the art upon review of the following drawings, detailed description and claims.

Reference now is made to the foregoing drawings in the following detailed description of this invention.

DETAILED DESCRIPTION

This invention is a method and system for adapting telephone-modem communication signals to use a wireless (non-dedicated wire) communication channel. In its preferred embodiment an AC power line communication channel is used. Alternative embodiments may use an RF over-the-air channel. The substitution of RF over-the-air can generally be substituted without departing from the concept of this invention. The AC power line communication channel permits communication between telephones, computers and other electronic equipment without requiring dedicated or telephone wiring. This approach makes use of the existing AC power wiring by imposing the communication signal on the AC power lines and by facilitating the transmission and reception of the signals by standard telephones, computers or other communication equipment. This invention also employs a standard communication or networking protocol. In its preferred embodiment, this invention employs the HomePNA 2.0 protocol, although alternative protocols can be substituted without departing from the concept of this invention. Such alternative communication protocols, include but are not limited to: CEA R.7.3, HomePlug 1.0, IEEE 802.11, HomeRF, Bluetooth 803.xx, and other versions of each as well as HomePNA.

HomePNA, the preferred protocol of this invention, is adapted specifically for networking multiple computers and/or other devices within a local area. Generally, designed for use with telephone wiring, this invention permits the substitution of AC power lines, for communicating between the multiple computers, telephones or other devices, while still providing the advantages of HomePNA, or the alternative, protocols. The use of a HomePNA type networking protocol, in combination with an AC power line communication channel provides a method and system for communication at rates of between 1 Mbit/sec and 10 Mbit/sec, using a standard proven protocol that works with existing personal computer operating systems, while avoiding the requirement of dedicated telephone or other wiring, otherwise required to provide the communication channel or medium. This system also facilitates the communication of data, voice, fax, and multimedia signals over the common AC power line. This invention provides improved signal strength, signal-to-noise ratios, and data security. Sophisticated, modulation, error correction and encryption techniques are employed.

Figure 1:
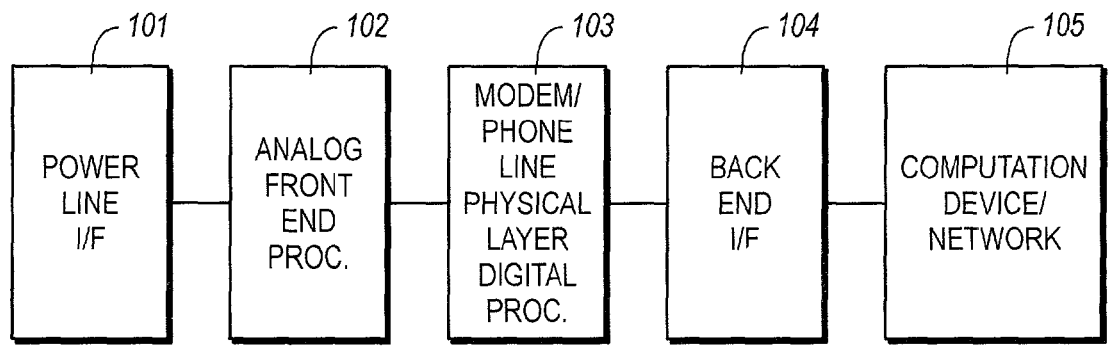
FIG. 1 is a top-level block diagram of the preferred embodiment of this invention.

Referring now to the figures and particularly FIG. 1, which is a top-level block diagram of the preferred embodiment of this invention. A power line interface 101 connects the system to an AC power line. In electrical communication with the power line interface 101 is an analog front-end processor 102, which amplifies, filters and converts analog signals to digital signals, as well as digital signals to analog signals, for processing. Connected to the analog front-end processor 102 is the modem/phone line physical layer digital processor 103, where, in the preferred embodiment, the HomePNA-type protocol is performed. The modem/phone line physical layer digital processor 103 is connected to the back end interface 104, which provides the handshaking with the computer or other networked device 105. The preferred computer or other networked device 105 may be interfaced to a network device, using such network protocols as ISA, MII, PCI, USB, PCMCIA, and/or Ethernet. Preferably, within the computation device 105 encryption/decryption is provided to provide communication channel security.

Figure 2:
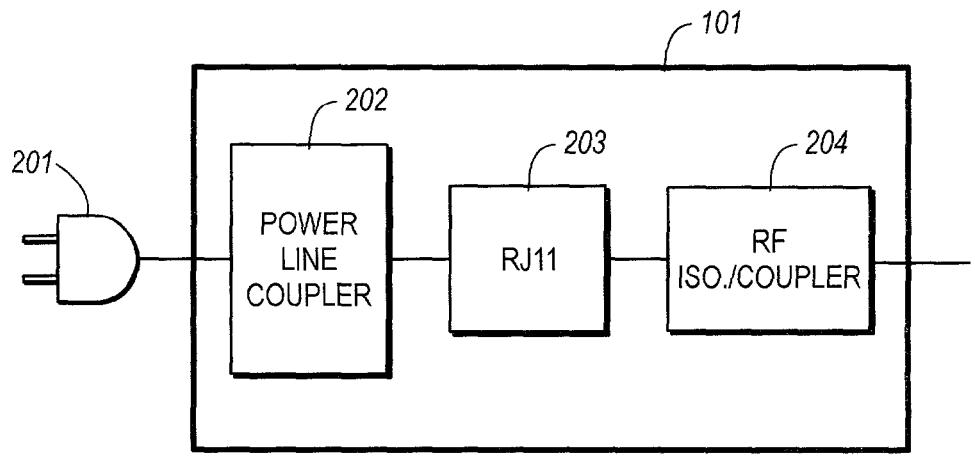
FIG. 2 is a block diagram of the preferred embodiment of the power line interface section of this invention.

FIG. 2 shows a block diagram of the preferred embodiment of the power line interface 101 section of this invention. The power line interface 101 couples the usable RF band on to and off of the AC power line. The preferred power line interface 101 includes a power line coupler 202, which is electrically connected to a standard AC power outlet, via a standard power plug 201. Electrically connected to the power line coupler 202 is a connector, typically and preferably and standard RJ-11 connector. The connector 203 is electrically connected to an RF isolator/coupler 204.

Figure 3:
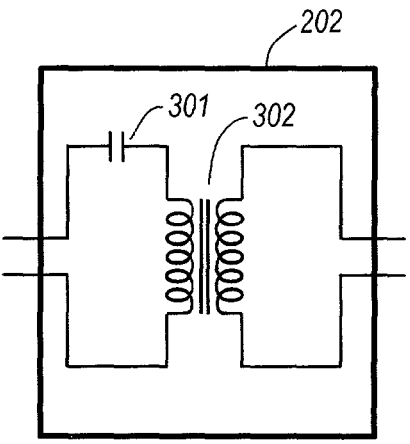
FIG. 3 is a schematic of the preferred power line coupler of this invention.

FIG. 3 shows a schematic of the preferred power line coupler 202 of this invention. This preferred coupler 202 is designed for low loss, and has a low frequency isolation capacitor 301, as well as a low loss transformer 302. The preferred capacitor 301 has a capacitance of 0.01 $\mu$F. The preferred transformer 302 has a resistance of about 50 $\Omega$ and approximately 50 micro Henries. The preferred coupler 202 uses magnetic coupling, although alternative couplers, including but not limited to optical and/or capacitive coupling can be substituted without departing from the concept of this invention.

Figure 4:
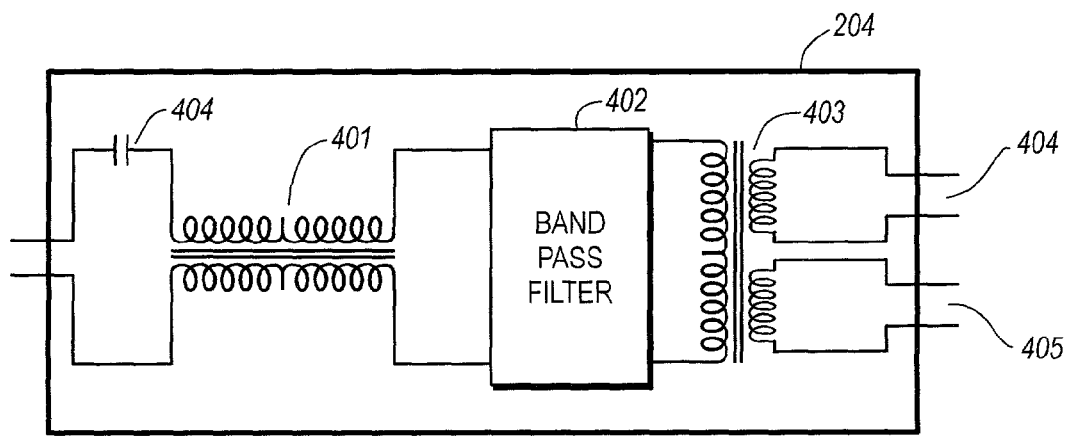
FIG. 4 is a detailed diagram of the preferred isolation RF coupling section of this invention.

FIG. 4 shows the detailed diagram of the preferred RF isolation coupling section 204 of this invention. A high pass filter capacitor 404 is provided connected to a common mode filter 401, the other side of which is connected to a band pass filter 402. The preferred band pass filter 402 passes signals in the frequency range of between 4.5 MHz and 9.5 MHz, to facilitate the use of the HomePNA protocol. An RF transformer 403 is electrically connected to the band pass filter 402 to provide line isolation. The RF transformer 403 has two connections, 404 for outgoing signals and 405 for incoming signals.

Figure 5:
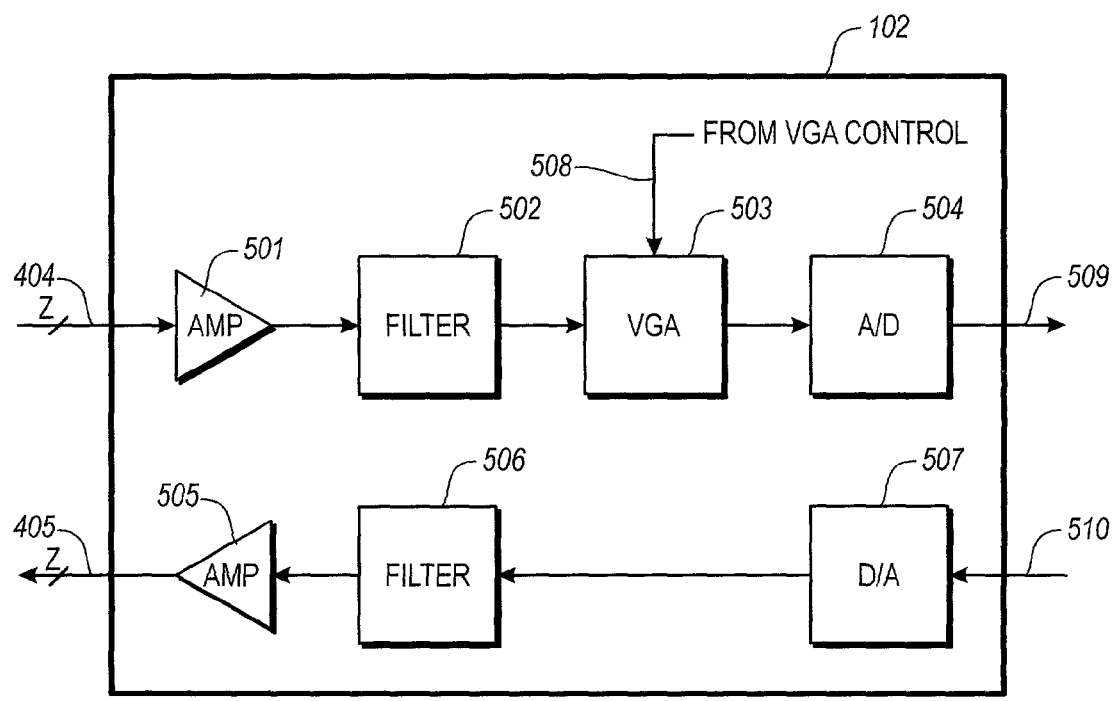
FIG. 5 is a detailed block diagram of the analog front end processing of this invention.

FIG. 5 shows a detailed block diagram of the analog front-end processor 102 of this invention. An outgoing signal amplifier 501, preferably but not necessarily a discrete amplifier, received the outgoing signal 404. The output of the outgoing signal amplifier 501 is connected to the input of an anti-aliasing filter 502. The anti-aliasing filter 502 feeds a variable gain amplifier 503, which is controlled 508 from the variable gain amplifier controller 701 (see FIG. 7).

The output of the variable gain amplifier 503 is received by an analog-to-digital converter 504, which in turn produces a digital version of the outgoing signal 509 for use by the modem/phone line physical layer digital processor 103. The preferred A/D converter 504, is a 12-bit A/D. The incoming signal 405 is amplified by an amplifier 505, after being filtered by a reconstruction filter 506. The reconstruction filter 506 receives its input signal from a digital-to-analog converter 507, which receives the input source signal 510 from the modem/phone line physical layer digital processor 103. The current preferred D/A converter 507 is a 10-bit D/A. The amplifiers 501, 505 are provided to increase the signal power on the power line from about 35 bm to about 10 dbm to −20 dbm.

Figure 6:
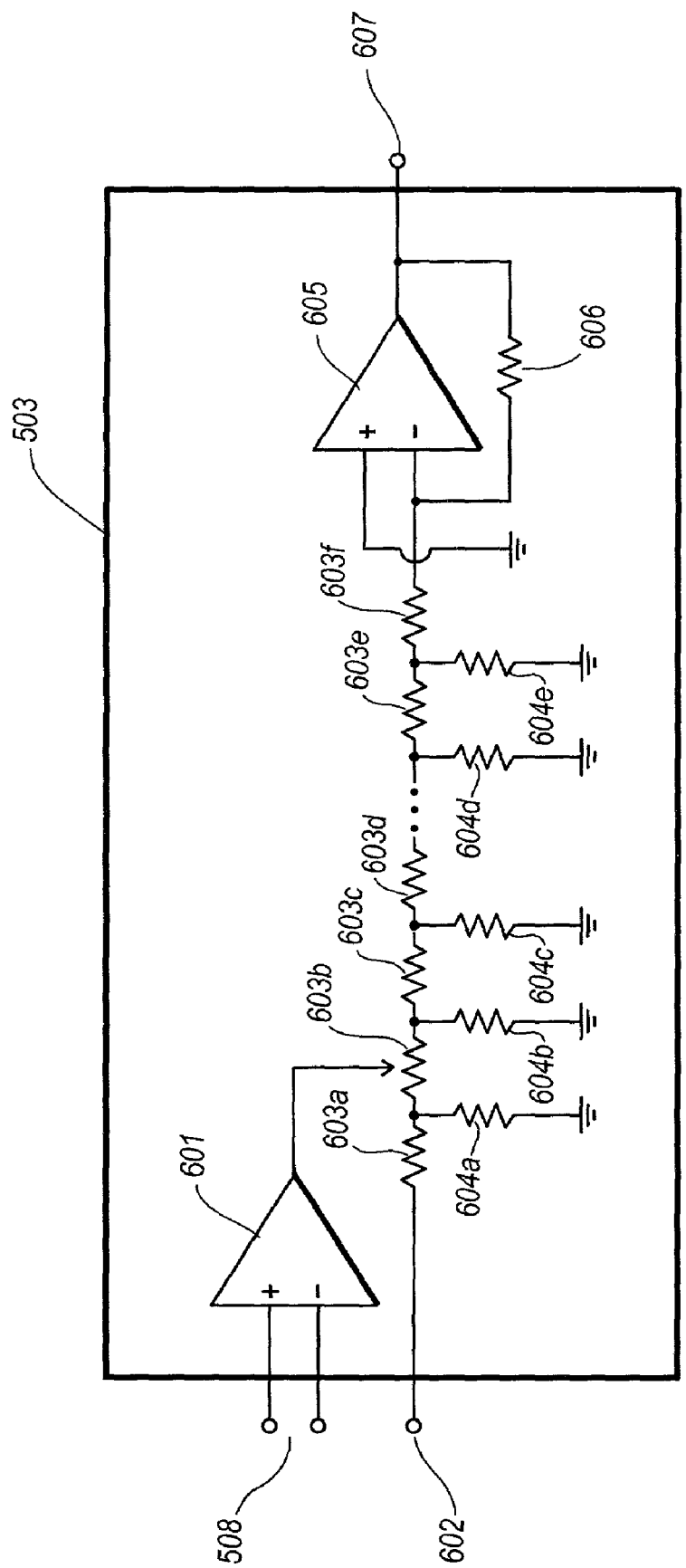
FIG. 6 is a schematic of the preferred variable gain amplifier of this invention.

FIG. 6 shows a schematic of the preferred variable gain amplifier 503 of this invention. This amplifier 503 has buffer 601, which receives a control voltage 508 from the variable gain amplifier controller 701. The buffer 601 selects the appropriate resistance value from a set of series and parallel resistors 603a–f, 604a–e. The input signal 602 reaches the input of the gain stage 605, which is provided with a feed back path resistance 606 and which provides the output 607 of the variable gain amplifier 503.

Figure 7:
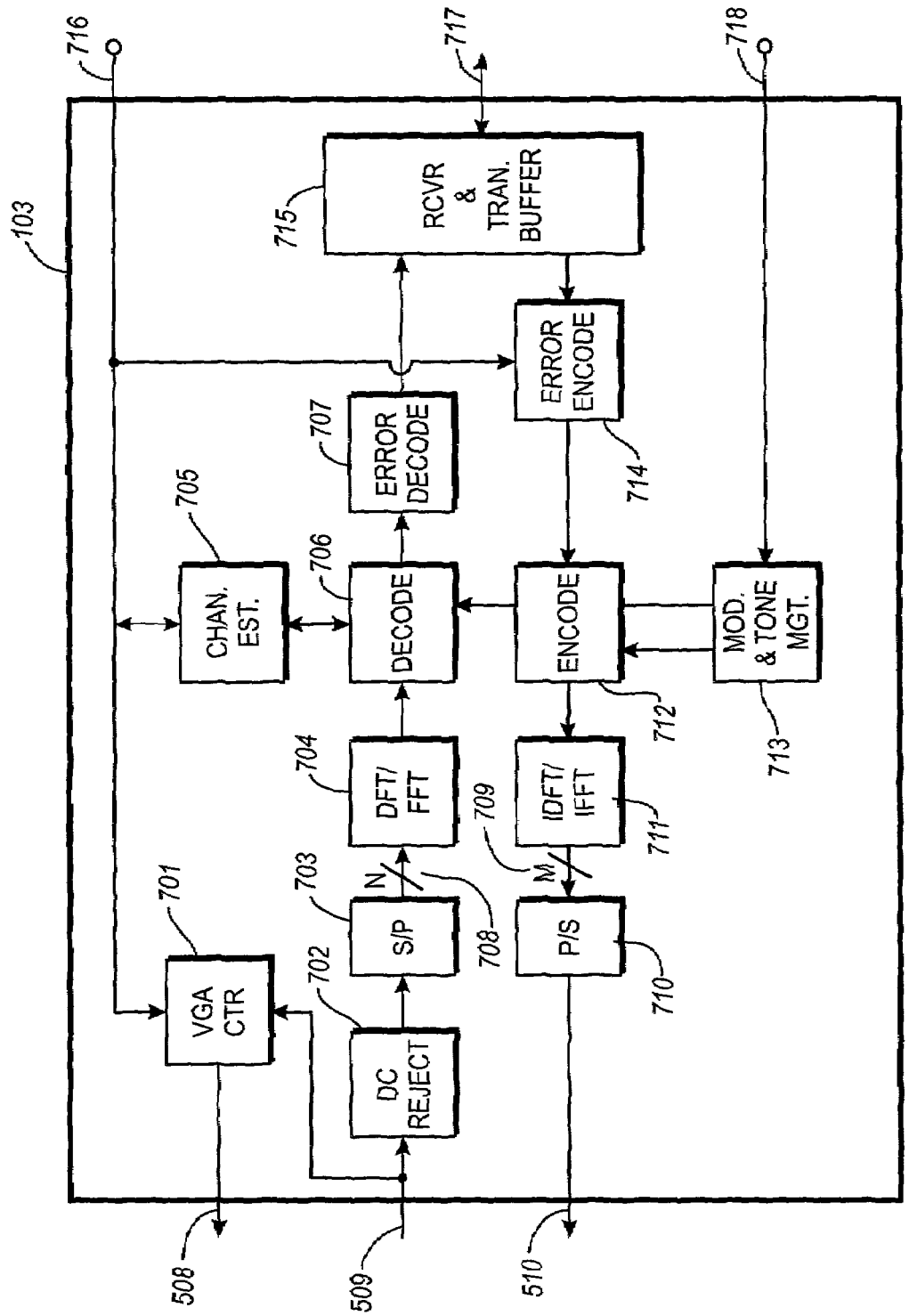
FIG. 7 is a detailed block diagram of the preferred modem/phone line physical layer digital processing.

FIG. 7 shows a detailed block diagram of the preferred modem/phone line physical layer digital processor 103. A variable gain amplifier controller 701 is provided to optimize the input levels and to thereby cooperate with the variable gain amplifier 503 to compensate for power losses. The variable gain amplifier controller 701 is controlled by a signal 716 from the media access controller 901 (see FIG. 9). A dc reject 702 receives the outgoing signal 509 to remove dc bias. The preferred dc reject 702 circuit is an averager followed by a subtractor. The output of the dc reject 703 is the input to a serial-to-parallel converter 703, which preferably provides between 64 and 512 parallel output signals 708. These parallel signals 708 are received by a transform circuit 704, typically and preferably in the HomePNA protocol, either a discrete Fourier transform or a fast Fourier transform. The transform circuit 704 outputs the transformed signal to a decoder 706, which is provided to turn received symbols into bits using modulation tone estimates from the channel estimator 705, under control of the modulator and tone manager 713. The channel estimator 705 is controlled by signals from the media access controller 901. The channel estimator 705 is used to compensate for degradation in the channel, by estimating the usable frequencies or channel quality for each tone, for OFDM modulation. The quality of the channel is generally described by the signal-to-noise ration and/or the signal strength. The decoder 706 output is fed to an error decoder 707, which is used to implement forward error correction, preferably using such techniques as Reed-Solomon, Viterbi, RS-Viterbi, Iterative Viterbi, Turbo Viterbi, and/or Turbo Product Codes. The output of the error decoder 707 is received by the receiver and transmitter buffer 715, from which the data 717 is communicated to the media access controller 901. The input signal 510 within the modem/phone line physical layer digital processor 103 begins in the receiver and transmitter buffer 705. The received data is output from the receiver and transmitter buffer 715 to an error encoder 714. The error encoder 714 is used to implement forward error correction, preferably using such techniques as Reed-Solomon, Viterbi, RS-Viterbi, Iterative Viterbi, Turbo Viterbi, and/or Turbo Product Codes. The output of the error encoder 714 is received by an encoder 712, which turns bits into symbols using modulation tone estimates per frequency bin, in the preferred OFDM modulation implementation. The encoder 712 is controlled by the modulation and tone manager 713. The preferred modulation technique of this invention is OFDM, although alternatives, such as BPSK, DBPSK, QPSK, DQPSK, OGPSK, 8-PSK, D8-PSK, QAM 16, QAM 32, QAM 64 and other similar modulation techniques can be substituted without departing from the concept of this invention. The modulation and tone manager 713 uses channel estimates to compensate for channel characteristics; specifically it selects or differentiates between usable channels in the transmission medium. The output of the encoder 712 is received by an inverse transformer 711, preferably an inverse discrete Fourier transform or an inverse fast Fourier transform. The output of the inverse transformer 711 is typically a bus of 64 to 512 parallel input lines 709, which feed into a parallel-to-serial converter 710, the output of which is the input signal 510.

Figure 8:
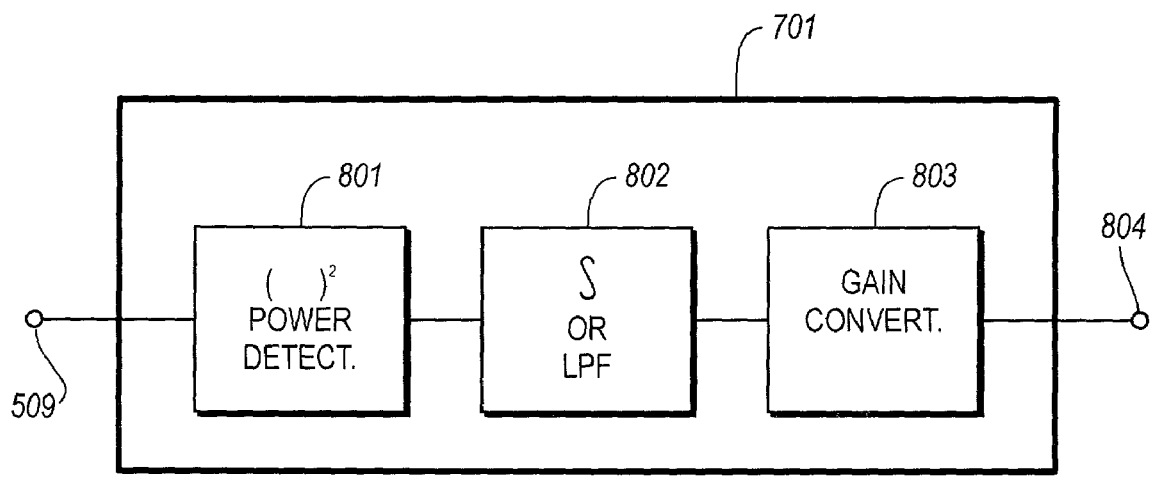
FIG. 8 is a more detailed diagram of the preferred variable gain amplifier controller of this invention.

FIG. 8 shows a more detailed diagram of the preferred variable gain amplifier controller 701 of this invention. This controller 701, which serves to estimate signal power and to calculate the necessary power gain required, has a power detector 801, which is connected to an integrator or low-pass-filter 802, the output of which is a gain converter 803. The gain converter 803 serves to "calculate" the gain from the power in the estimate.

Figure 9:
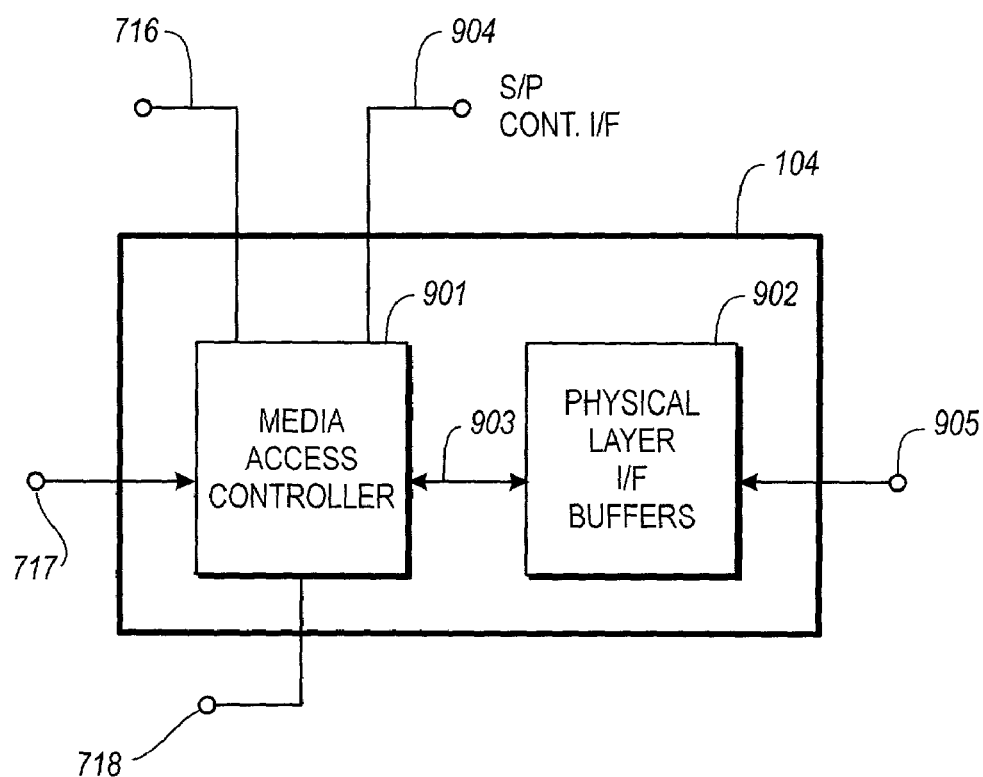
FIG. 9 is a block diagram of the back end interface section of the preferred embodiment of the invention.

FIG. 9 shows a block diagram of the back end interface section 104 of the preferred embodiment of the invention. A media access controller 901 in electronic communication 903 with the physical layer interface buffers 902. The media access controller 901 is preferably connected to a serial/parallel control interface 904. The preferred media access controller 901 employs carrier sense multiple access collision avoidance (CSMA/CA) to control access to the power line physical medium by monitoring line or channel access availability. The preferred physical layer interface buffers 902 are FIFOs, typically 2 k by 8 bits and are provided to permit data handshaking at different rates. These FIFOs may be installed within a digital computer device.

Figure 10:
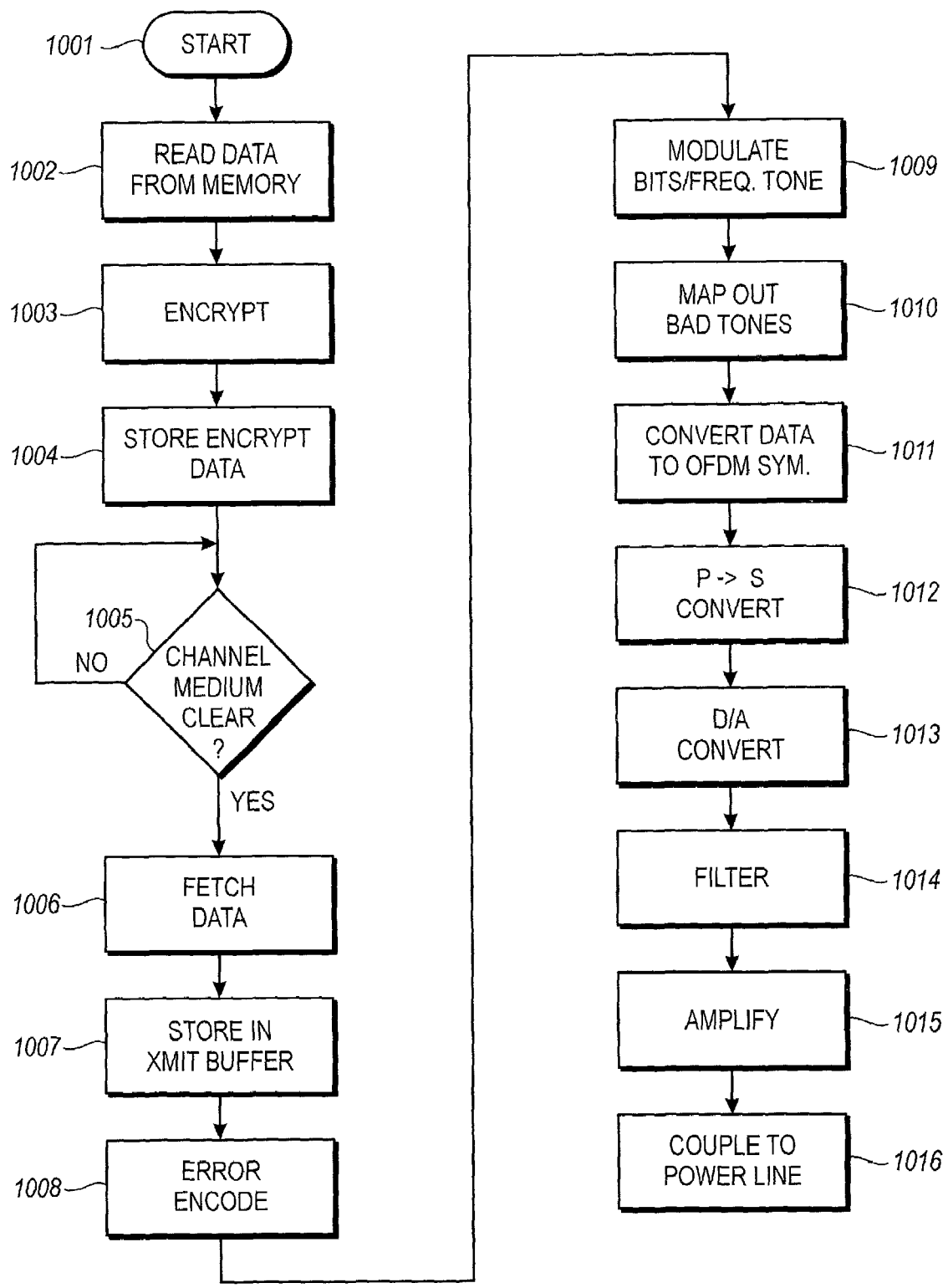
FIG. 10 is a flow chart of the preferred steps of the method for the transmit of data from a computer to the AC power line.

FIG. 10 is a flow chart of the preferred steps of the method of the transmit of data from a computer to the AC power line. This process starts 1001 with data being read 1002 from computer memory. This data is then encrypted 1003 to provide channel security. The encrypted data is stored 1004. A test is made 1005 to determine if the channel medium is clear. If the channel is not clear, the test 1005 is repeated. If the channel is clear, data is fetched 1006 and is stored 1007 in the transmit buffer. Error encoding 1008 is performed, preferably using a forward error correction method. The bits/frequency tone is modulated 1009, preferably using OFDM, although other alternative modulation techniques can be substituted without departing from the concept of this invention. Bad tones are mapped out 1010. Data is converted 1011 to OFDM symbols. A parallel to serial conversion is performed 1012. A digital-to-analog conversion 1013 of the data is made. The analog data is then filtered 1014 and amplified 1015, before coupling 1016 the signal to the AC power line.

Figure 11:
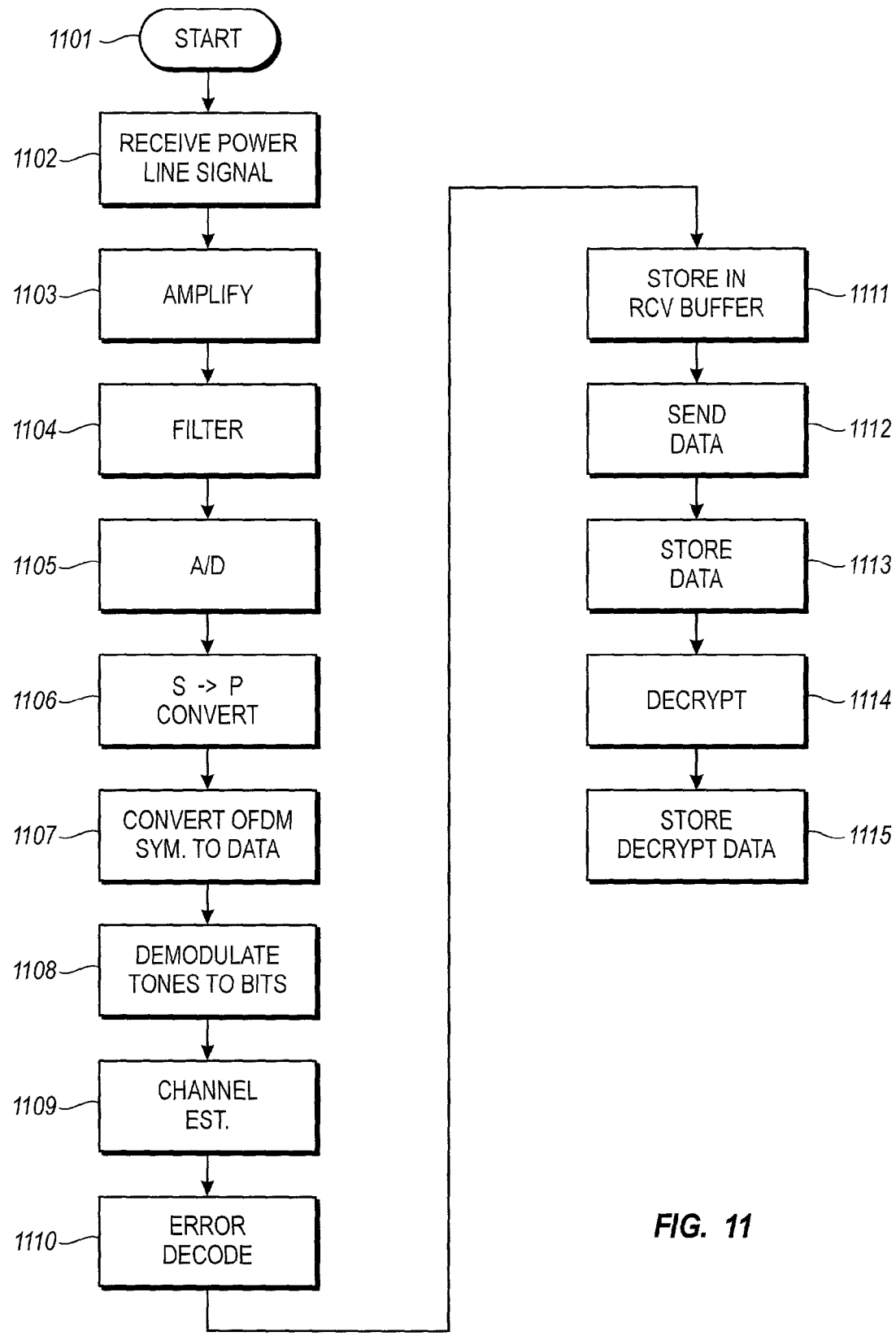
FIG. 11 is a flow chart of the preferred steps of the method of the receipt of data by a computer from the AC power line.

FIG. 11 shows a flow chart of the preferred steps of the method of the receipt of data by a computer from the AC power line. This process starts 1101 with the reception of a power line signal 1102. The signal is amplified 1103 and filtered 1104. The filtered data is next converted 1105 from an analog form to a digital form. The resulting digital form is converted 1006 from serial to parallel. OFDM symbols are next converted 1107 to data. The data (tones) is demodulated 1108 to bits. Channel estimating occurs 1109. Error decoding is performed 1110, using a forward error correction decoder. The resulted error corrected data is stored in a receive buffer 1111. The stored data is sent 1112 to the digital communication device, where the data is stored 1113, decrypted 1114 and the decrypted data is stored 1115 in computer memory.

Figure 12:
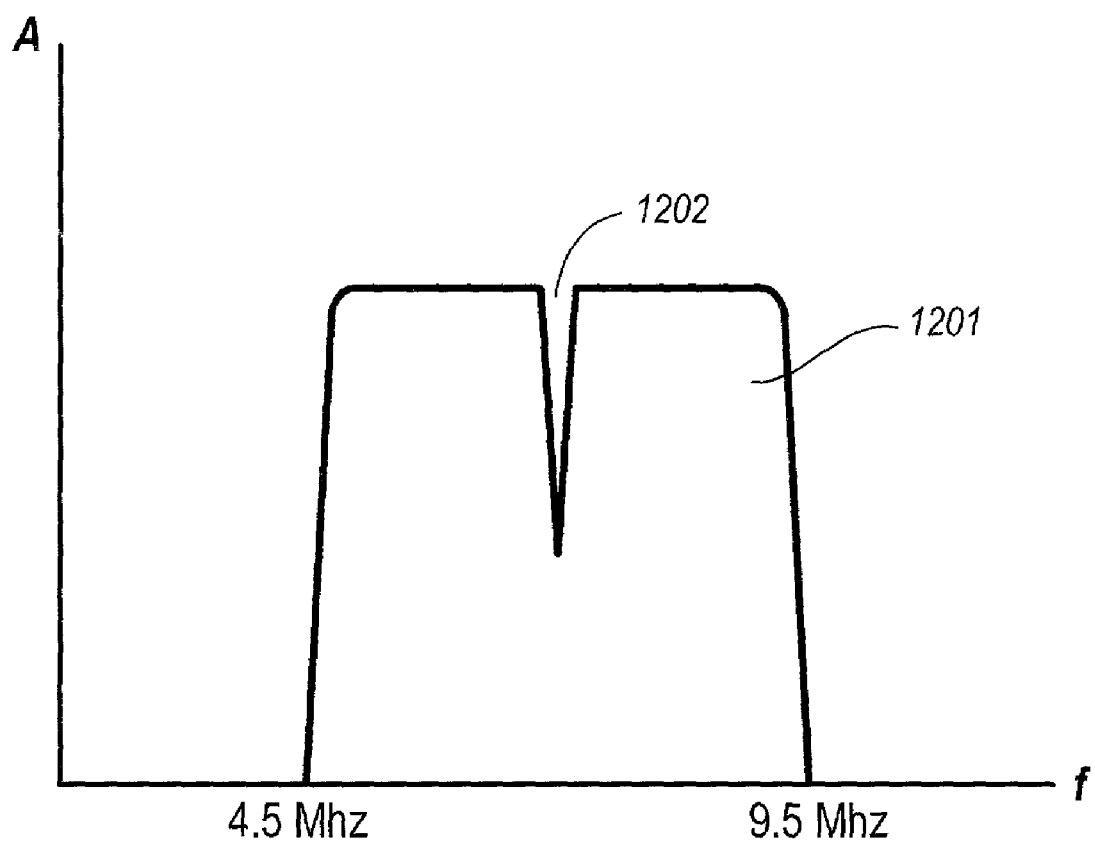
FIG. 12 is a drawing of the preferred spectrum used with this invention.

FIG. 12 is a drawing of the preferred spectrum 1201 used with this invention. The signal frequency band preferred for use in HomePNA systems has a band between 4.5 MHz and 9.5 MHz with a notch 1202 of approximately 0.5 MHz to accommodate the HAM band.

It is to be understood that the above-described embodiment of this invention is merely illustrative of numerous and varied other embodiments, some of which are noted in the description, which may constituted applications of the principles of the invention. Such other embodiments may be readily devised by those skilled in the art without departing from the spirit or scope of this invention and it is our intent that they are deemed to be within the scope of this invention.

What is claimed is:

1. A system for communication between electronic devices comprising:
   (A) a power line interface;
   (B) an analog front-end processor electrically connected to said power line interface;
   (C) a modem/phone line physical layer digital processor electrically connected to said analog front-end processor;
   (D) a back end interface electrically connected to said modem/phone line physical layer digital processor, wherein said back end interface further comprises a media access controller in communication with a physical layer interface buffer, said media access controller using carrier sense multiple access collision detection to control access to a power line; and
   (E) a computation device in electronic communication with said back end interface.

2. A method for communicating information from a first computation device to a second computation device, comprising:
   (A) reading data from computer memory;
   (B) encrypting said read data;
   (C) checking if a channel medium is clear;
   (D) fetching said encrypted data;
   (E) error encoding said fetched encrypted data;
   (F) modulating said error encoded data;
   (G) mapping out bad tones for transmit of error-encoded data;
   (H) filtering said error encoded data;
   (I) amplifying said filtered data; and
   (J) coupling said amplified data to an ac power line.

3. A method for communicating information from a first computation device to a second computation device, comprising:
   (A) receiving a power line communication signal;
   (B) amplifying said received power line communication signal;
   (C) filtering said amplified signal;
   (D) converting said amplified signal to data;
   (E) demodulating said data;
   (F) forward error decoding said demodulated data;
   (G) sending said decoded data to a computer memory; and
   (H) decrypting said data in computer memory.

4. A system for communicating between a computer device to a second computer device, comprising:
   (A) a power line communication channel;
   (B) a digital processor in electrical communication with said power line communication channel, wherein said digital processor employs a HomePNA protocol, wherein said digital processor further comprises a variable gain amplifier controller, said variable gain amplifier further comprising a power detector connected to an integrator low pass filter connected to a gain controller; and (C) an interface between said digital processor with a computer device, said computer device further encrypting data for transmit across said power line communication channel.

* * * * *